US012478257B2

(12) United States Patent
Seifert et al.

(10) Patent No.: US 12,478,257 B2
(45) Date of Patent: Nov. 25, 2025

(54) METHOD AND DEVICE FOR DETERMINATION OF HYPOXIA

(71) Applicants: ASOCIACIÒN CENTRO DE INVESTAGACIÒN COOPERATIVA EN NANOCIENCIAS "CIC NANOGUNE", Gipuzkoa (ES); ADMINISTRACIÒN GENERAL DE LA COMUNIDAD AUTÒNOMA DE EUSKADI, Àlava (ES)

(72) Inventors: Andreas Seifert, Guipuzcoa (ES); Ana Valero Valero, Guipuzcoa (ES); Ion Olaetxea Azkarate-Askatsua, Guipuzcoa (ES); Ibon Jaunarena Marin, San Sebastián (ES); Ander Izeta Permisàn, San Sebastian (ES); Hector Lafuente Echevarria, Gipuzkoa (ES)

(73) Assignees: ASOCIACIÒN CENTRO DE INVESTAGACIÒN COOPERATIVA EN NANOCIENCIAS "CIC NANOGUNE", Gipuzkoa (ES); ADMINISTRACIÒN GENERAL DE LA COMUNIDAD AUTÒNOMA DE EUSKADI, Àlava (ES)

( * ) Notice: Subject to any disclaimer, the term of this patent is extended or adjusted under 35 U.S.C. 154(b) by 0 days.

(21) Appl. No.: 18/022,043

(22) PCT Filed: Aug. 16, 2021

(86) PCT No.: PCT/EP2021/072694
§ 371 (c)(1),
(2) Date: Feb. 17, 2023

(87) PCT Pub. No.: WO2022/038081
PCT Pub. Date: Feb. 24, 2022

(65) Prior Publication Data
US 2024/0268676 A1    Aug. 15, 2024

(30) Foreign Application Priority Data

Aug. 18, 2020  (EP) .................................. 20382756

(51) Int. Cl.
*A61B 5/00*    (2006.01)
*A61B 5/1455*    (2006.01)

(52) U.S. Cl.
CPC ........ *A61B 5/0075* (2013.01); *A61B 5/14551* (2013.01); *A61B 5/725* (2013.01); *A61B 5/7267* (2013.01)

(58) Field of Classification Search
None
See application file for complete search history.

(56) References Cited

U.S. PATENT DOCUMENTS

| 2011/0257505 A1* | 10/2011 | Suri ........................ G16H 50/30 600/443 |
| 2016/0007892 A1 | 1/2016 | Esenaliev et al. |

(Continued)

FOREIGN PATENT DOCUMENTS

| RU | 2517220 | 5/2014 |
| WO | 2019060427 | 3/2019 |
| WO | 2020112682 | 6/2020 |

OTHER PUBLICATIONS

Schlabritz-Loutsevitch et al. "Raman Spectroscopy as a novel method in placental research: Recognizing the pattern of placental hypoxia", Journal of Raman Spectroscopy, vol. 48, No. 12, Dec. 1, 2017 (Dec. 1, 2017), pp. 1896-1899, 8 pages.*

(Continued)

*Primary Examiner* — Jonathan Cwern
(74) *Attorney, Agent, or Firm* — Barnes & Thornburg LLP

(57) ABSTRACT

The invention relates to a non-invasive method for determining hypoxia in a subject. The invention also relates to a (Continued)

device for carrying out said method and to the use of said device for determining hypoxia in a subject.

20 Claims, 8 Drawing Sheets

(56) References Cited

U.S. PATENT DOCUMENTS

2020/0281474 A1* 9/2020 Romfh ................ A61B 5/7275
2022/0238187 A1* 7/2022 Leblond ................ G16B 40/20

OTHER PUBLICATIONS

International Search Report and Written Opinion for PCT/EP2021/072694 dated Feb. 24, 2022.
Herve Abdi, "Partial Leas squares (PLS) Regression", The University of Texas at Dallas, 7 pages.
Pradeep Chowriappa et al., "Introduction to Machine Learning in Healthcare Informatics", Machine Learning in Healthcare Informatics, Intelligent Systems Reference Library 56, DOI: 10.1007/978-3-642-40017-9_1, Springer-Verlag Berlin Heidelberg, 2014, 23 pages.
Eilers et al., "Baseline Correction with Asymmetric Least Squares Smoothing", Oct. 21, 2005, 24 pages.
Tom Fearn, "Extended multiplicative scatter correction", Chemometric Space, NIR news, vol. 16 No. 4, 2005, 2 pages.
Gautam et al., "Review of multidimensional data processing approaches for Raman and infrared spectroscopy", EPJ Techniques and Instrumentation 2:8, 2015, 38 pages.
Lussier et al., "Deep learning and artificial intelligence methods for Raman and surface-enhanced Raman scattering", Trends in Analytical Chemisry, 124, 2020, 15 pages.
Randall D. Tobias, "An Introduction to Partial Leas Squares Regression", 8 pages.
Liland et al., "Model-based pre-processing in Raman spectroscopy of bilogical samples", Journal of Raman Spectroscopy, vol. 47. Feb. 10, 2016, pp. 643-650, 8 pages.

* cited by examiner (a)

(b)

METHOD AND DEVICE FOR DETERMINATION OF HYPOXIA

CROSS REFERENCE TO RELATED APPLICATIONS

This application is a U.S. national stage application under 35 U.S.C. § 371(b) of International Application No. PCT/EP2021/072694 filed Aug. 16, 2021, which claims priority to the European Patent Application No. 20382756.3 filed on Aug. 18, 2020, the disclosures of both of which are hereby expressly incorporated by reference in their entirety.

FIELD OF THE INVENTION

The present invention relates to a method for determining hypoxia and to a device for carrying out said method. In particular, the invention relates to the use of Raman spectroscopy for the detection of hypoxia.

BACKGROUND OF INVENTION

Lack of appropriate oxygenation levels in tissue (hypoxia) underscores the development of numerous pathologies and dysfunctions in living organisms. Detection of hypoxia thus has strong implications in human pathology, sports medicine and veterinary medicine. Methods and devices that accurately determine local hypoxic conditions in living tissues may have broad applicability on numerous fields. One such field is the intrapartum fetal compromise resulting from hypoxic stress during labour.

At the moment, invasive in vivo methods are commonly used to detect and diagnose hypoxia-ischemia (HI) conditions during labor. For example, during delivery, a usual method for determining hypoxia in the fetus is based on invasive fetal blood sampling (FBS) from the scalp of the fetus followed by lactate or pH measurement. However, this procedure is uncomfortable, discontinuous, time-consuming and presents significant failure rates. Moreover, pH determination cannot discriminate between respiratory and metabolic acidosis.

Most common non-invasive in vivo methods for determining hypoxia in a fetus during labor are Cardiotocography (CTG), fetal pulse oximetry and Fetal Electrocardiography (ECG). Cardiotocography (CTG) is based on Doppler ultrasounds detected by a transducer situated on the mother's abdomen next to the fetal heart and used to monitor fetal cardiac frequency (FCF) rate. In addition, uterine contractions are measured by a pressure transductor and printed continuously on paper. However, external CTG sometimes experiences signal losses and internal CTG may be used as an alternative, by adhering an electrode to the fetal scalp once the amniotic membranes are open. Then, FCF rate is classified as normal or abnormal (the latter occurring in 15% of deliveries) and the handling of abnormal FCF ranges from simple changes in posture to urgent intervention (cesarean section). Nevertheless, since FCF patterns vary per subject, abnormal CTG does not necessarily indicate fetal suffering and has a subjective component.

Fetal pulse oximetry determines by optical methods the oxygen saturation of fetal hemoglobin. However, available clinical evidence in support of the use of pulse oximetry in the event of non-reassuring FCF patterns is scarce, and the clinical trials performed present numerous methodological limitations.

Fetal electrocardiography (ECG), through the analysis of the ST segment (STAN), is performed by adhering an electrode to the fetal scalp, which informs of fetal myocardial function in response to hypoxia. This represents an indirect measure of fetal brain oxygenation status. Under acute hypoxemia, a mature fetus elevates ST segment and augments progressively the height of the T wave (T/QRS ratio). Depression of ST segment and negative T wave are indicative of lack of response of the myocardium to hypoxic stress. However, this analysis is not recommended as routine in standard deliveries.

What is still missing by today is a non-invasive, continuous measuring method in real-time, which is sensitive and specific for determining hypoxia (particularly in a fetus during labour) in a reliable way.

Therefore, there is room for substantial improvement in state-of-the-art intrapartum hypoxia measurement. In particular, there is a need for a sensitive and specific in vivo method that allows a continuous monitoring of the physiological state in real-time but non-invasively for detecting hypoxia in vivo. Depending on its characteristics, said method might also have application in the detection of hypoxia in other human tissues and pathologies, as well as in sports and veterinary medicine.

SUMMARY OF THE INVENTION

The authors of the invention have found that hypoxia and post-hypoxia conditions display a characteristic Raman spectrum, which allows the detection of the subject suffering hypoxia or having suffered hypoxia (post-hypoxia), making an early diagnosis of the condition or its consequences possible. Moreover, the authors of the present invention have developed a non-invasive in vivo method for determining hypoxia or post-hypoxia in a subject based on Raman measurements.

Thus, in a first aspect, the invention relates to a non-invasive method for determining hypoxia or post-hypoxia in a subject comprising:
(a) collecting a Raman spectrum by contacting the tissue from the subject with a non-invasive Raman probe thereby obtaining a multivariable data set that represents the Raman spectrum from the subject; and;
(b) identifying the subject as hypoxic, post-hypoxic or normoxic by a predictive model which correlates the multivariable data set generated in step (a) with representative data sets from spectra obtained from previously identified hypoxic, post-hypoxic and normoxic subjects,
said predictive model having been generated by training a computer with a plurality of Raman spectra from previously identified hypoxic, post-hypoxic and from normoxic subjects and machine learning on said plurality of Raman spectra so as to obtain representative multivariable data sets associated with hypoxia, post-hypoxia and with non-hypoxia.

In a second aspect the invention relates to a device for carrying out a method as defined in any of the particular embodiments of the invention which comprises:
i) a non-invasive Raman probe,
ii) a Raman spectrometer comprising a light source, which is fiber-coupled to the Raman probe,
iii) a computer containing instructions, which cause the computing system to carry out the method according to any of the embodiments of the invention.

In a third aspect the invention relates to the use of the device of the invention, for determining hypoxia or post-hypoxia in a subject.

DETAILED DESCRIPTION OF THE INVENTION

Figure 1:
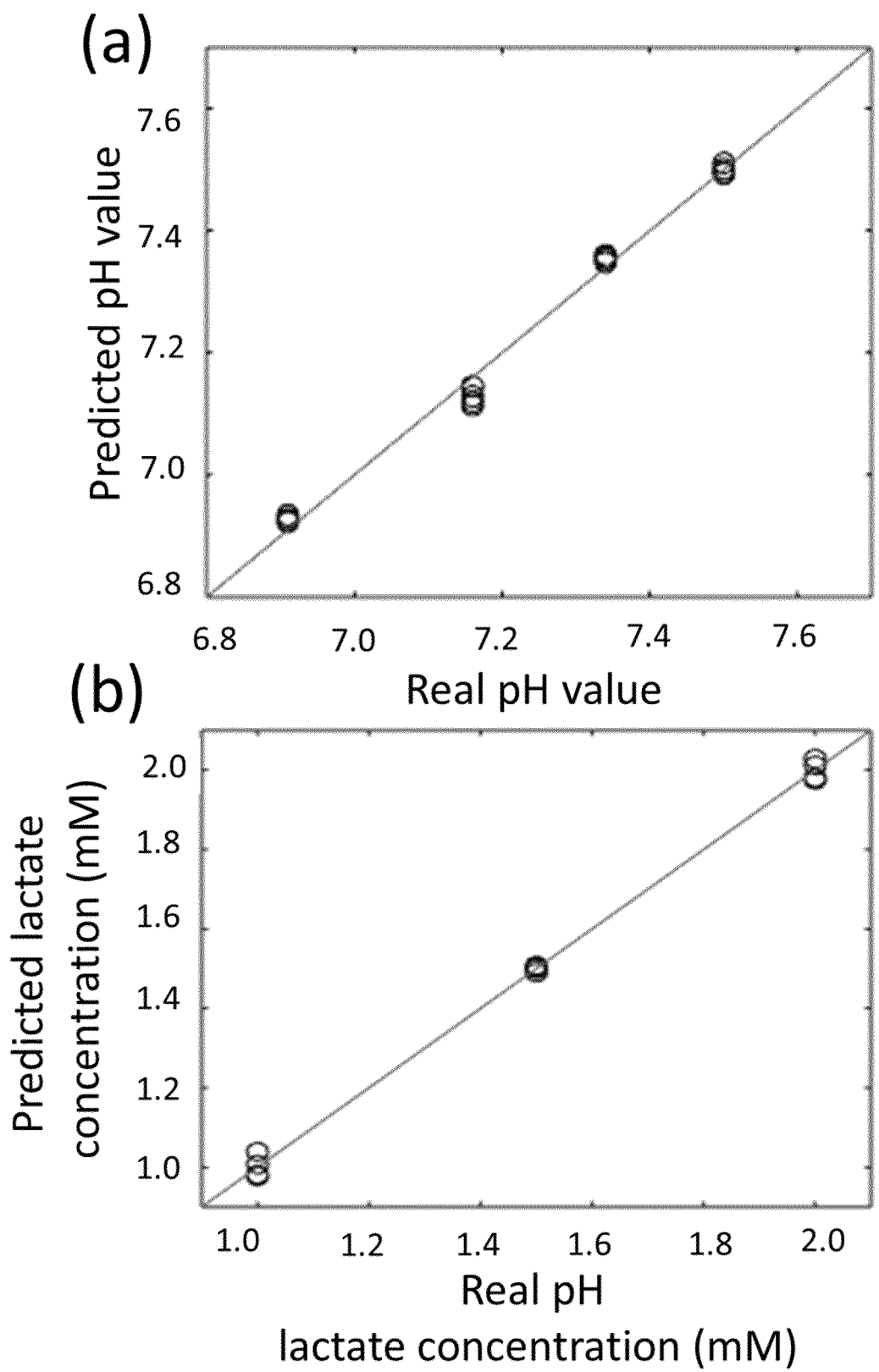
FIG. 1. Prediction of (a) pH and (b) lactate concentration values by optimized PLS (partial least squares) regression model in blood samples.
Figure 2:
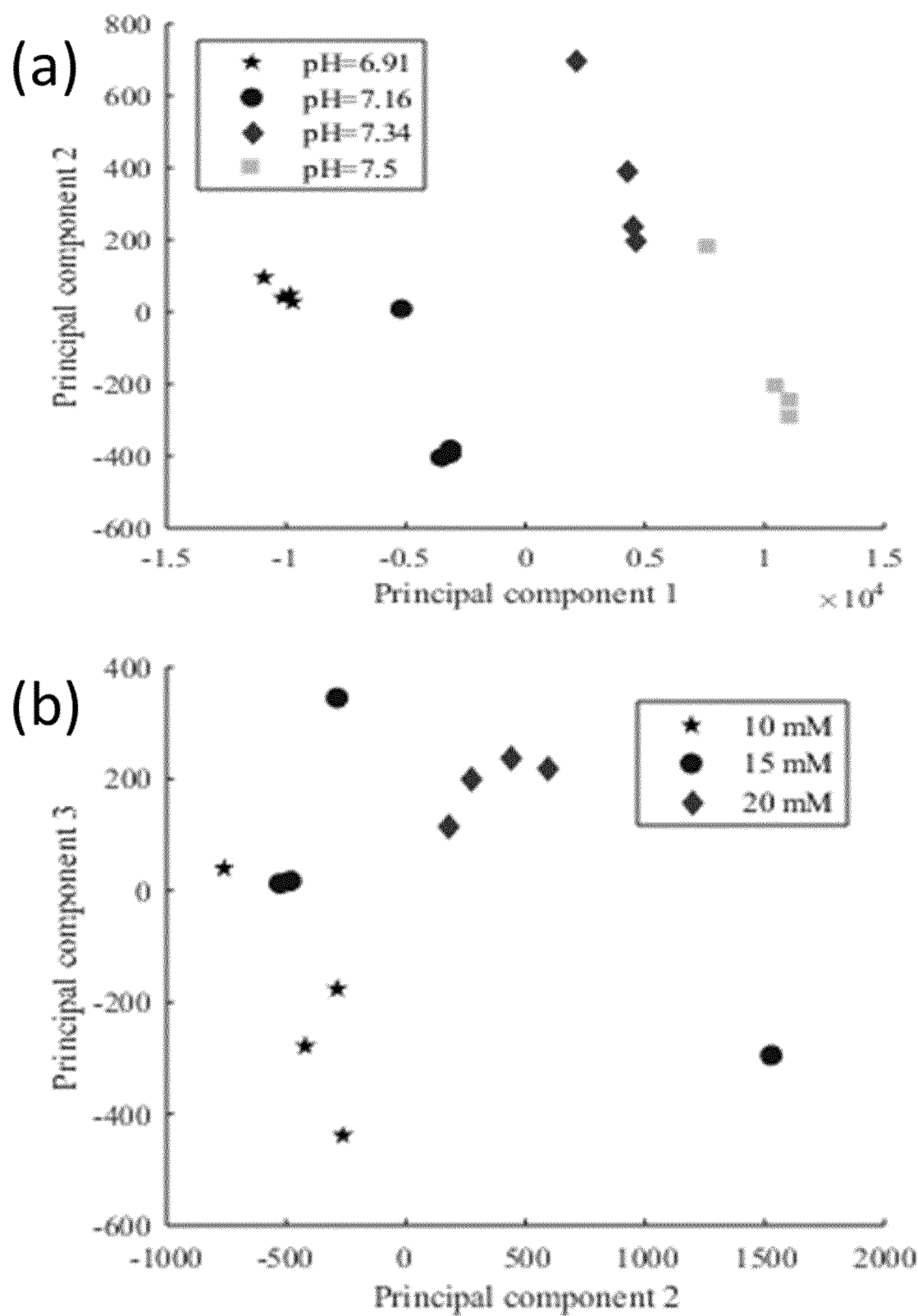
FIG. 2. PCA (principal component analysis) of Raman spectra from blood samples with different (a) pH values and (b) lactate concentrations in the physiological range.

The authors of the invention have found that hypoxia and post-hypoxia subjects display a characteristic Raman spectrum, which allows the detection of the subject suffering hypoxia or having suffered hypoxia, making an early diagnosis of the condition or its consequences possible. Moreover, the authors of the present invention have developed a non-invasive method for determining hypoxia or post-hypoxia in a subject based on the determination of the Raman spectrum in a non-invasive manner. This specific detection method will allow the identification of hypoxia or post-hypoxia subjects and to take the necessary actions in order to overcome the condition at an early stage.

With regard to the terms used in the present description, unless otherwise defined, scientific and technical terms used in connection with the present invention shall have the meanings that are commonly understood by those of ordinary skill in the art. The meaning and scope of the terms should be clear, however, in the event of any latent ambiguity, definitions provided herein take precedent over any dictionary or extrinsic definition.

Method for Determining Hypoxia

In a first aspect, the invention relates to a non-invasive method for determining hypoxia or post-hypoxia in a subject comprising:
(a) collecting a Raman spectrum by contacting the tissue from the subject with a non-invasive Raman probe thereby obtaining a multivariable data set that represents the Raman spectrum form the subject; and;
(b) identifying the subject as hypoxic, post-hypoxic or normoxic by a predictive model which correlates the multivariable data set generated in step (a) with representative data sets from spectra obtained from previously identified hypoxic subjects and from normoxic subjects,
said predictive model having been generated by training a computer with a plurality of Raman spectra from previously identified hypoxic and normoxic subjects by machine learning on said plurality of Raman spectra so as to obtain representative multivariable data sets associated with hypoxia and normoxia.

In a particular embodiment, the method is a continuous method (i.e. allows continuous monitoring of the physiological state of a subject), preferably during between 100 and 18000 seconds, and more preferably, between 500 and 15000 seconds.

In another particular embodiment, the method is a real-time method; particularly steps (a) and (b) can be performed in less than 5 seconds, preferably in less than 2 seconds, more preferably in less than 1 second, even more preferably in less than 0.1 second.

In a particular embodiment, the method is an "in vivo" or "ex vivo" method, preferably is an "in vivo" non-invasive method.

The term "non-invasive" regarding to the methods relates to a method which is applied to the tissue of the subject under examination and which is able to detect a specific signal originating from the tissue but which does not require damaging, passing, entering, or penetration through the tissue, in particular through the skin.

The term "in vivo", as used herein, refers to the fact that the method is carried out on the body of a living human or animal subject; preferably on a human subject.

As used herein the term "determining" and derivations of this term refer to detecting the presence or absence of hypoxia or the presence or absence of post- hypoxia in a subject. According to the present invention, "determining" also includes detecting, evaluating, quantifying, or measuring. This term also includes determining hypoxia in a subject at a time point and determining hypoxia in a subject over time (also denoted herein as "monitoring" and derivations of this term).

The term "hypoxia", as used herein, refers to a situation of oxygen depletion in the tissues, to a decrease below normal levels of oxygen in inspired gases, or arterial blood or a state of diminished availability of oxygen to the body tissues but without reaching anoxia. Hypoxia is characterized by a reduced oxygenation level in a tissue (such as a cell), as compared to normoxia (oxygenation level of about 20 percent to about 21 percent oxygen). In some embodiments, the hypoxia status is based on a low oxygenation level in the tissue. In some embodiments, the low tissue oxygenation level is of about 5 percent oxygen or less, such as about any of 4.75 percent oxygen or less, 4.5 percent oxygen or less, 4.25 percent oxygen or less, 4 percent oxygen or less, 3.75 percent oxygen or less, 3.5 percent oxygen or less, 3.25 percent oxygen or less, 3 percent oxygen or less, 2.75 percent oxygen or less, 2.5 percent oxygen or less, 2.25 percent oxygen or less, 2 percent oxygen or less, 1.75 percent oxygen or less, 1.5 percent oxygen or less, 1.25 percent oxygen or less, 1 percent oxygen or less, 0.75 percent oxygen or less, 0.5 percent oxygen or less, or 0.25 percent oxygen or less.

In particular embodiments, "hypoxia" or "hypoxic" conditions may be defined by arterial $PO_2$ values less than approximately 80 mm Hg and venous $PO_2$ values less than approximately 30 mm Hg. In some embodiments, "hypoxia" or "hypoxic" conditions may be defined by arterial $PO_2$ values less than approximately 60 mm Hg. In certain embodiments, "hypoxia" or "hypoxic" conditions may be defined by arterial $PO_2$ values less than approximately 50 mm Hg. In a particular embodiment, "hypoxia" or "hypoxic" conditions may be defined by arterial $PO_2$ values between approximately 50-20 mm Hg. Furthermore, "hypoxia" or "hypoxic" conditions may be differentiated from anoxia, which is defined as an absence or almost complete absence of oxygen from arterial blood or tissues. In some embodiments, "hypoxia" or "hypoxic" conditions may be defined by intra-tissue $PO_2$ levels less than about 10 mm Hg. In some embodiments, "hypoxia" or "hypoxic" conditions may be defined by intra-tissue $PO_2$ levels less than about 5 mm Hg. In some embodiments, "hypoxia" or "hypoxic" conditions may be defined by intra-tumor $PO_2$ levels less than about 10 mm Hg. In some embodiments, "hypoxia" or "hypoxic" conditions may be defined by intra-tumor $PO_2$ levels less than about 5 mm Hg.

Typically, hypoxia is detected by pulse oximetry, blood gas analysis (oxygen, carbon dioxide levels) and analysis of exhaled breath by gas chromatography/mass spectrometry to detect certain volatile organic compound (VOC), which are found to be related with hypoxic conditions, such as pentanal, 4-butyrolactone, 2-pentanone, 2-hexanone, 2-cyclopenten-1-one, 3-methylheptane and 2-heptanone.

In an embodiment, hypoxia comprises affinity hypoxia, anemic hypoxia, circulatory hypoxia, histotoxic hypoxia, hypoxemic hypoxia and stagnant hypoxia.

In some embodiments, the hypoxia is caused by deficiency of oxygen in the atmosphere, as in altitude sickness; pulmonary disorders that interfere with adequate ventilation of the lungs; anemia or circulatory deficiencies, leading to inadequate transport and delivery of oxygen to the tissues; edema or other abnormal conditions of the tissues themselves that impair the exchange of oxygen and carbon dioxide between capillaries and tissues; consequence of ischemia. Signs and symptoms vary according to the cause. Generally, they include dyspnea, rapid pulse, syncope, and mental disturbances such as delirium or euphoria; cyanosis is not always present.

The term "affinity hypoxia" refers to hypoxia resulting from failure of the hemoglobin to release oxygen to the tissues, as may occur with a left-shifted oxyhemoglobin dissociation curve.

The term "anemic hypoxia" refers to hypoxia resulting from reduction of the oxygen-carrying capacity of the blood as a result of a decrease in the total hemoglobin or an alteration of the hemoglobin constituents.

The term "circulatory hypoxia" refers to stagnant hypoxia. The term "stagnant hypoxia" refers to hypoxia due to failure to transport sufficient oxygen because of inadequate blood flow, as in heart failure.

The term "histotoxic hypoxia" refers to impaired utilization of oxygen by tissues, such as in cyanide poisoning.

The term "hypoxemic hypoxia" refers to hypoxia due to insufficient oxygen reaching the blood, such as at the decreased barometric pressures of high altitudes.

The term "stagnant hypoxia" refers to situations in which blood flow is abnormally low as occurs in shock, syncope or other "low-flow" states.

In the context of the present invention, the term "normoxia" is understood as non-hypoxia condition, thus a subject can be a normoxic subject. Normoxic subjects might be used as control subjects.

The term "post-hypoxia", as used herein, refers to the situation in which a subject has suffered from a hypoxia episode and in which the conditions that led to the hypoxia have disappeared and has reached normoxia.

In a particular embodiment, the hypoxia or the hypoxic episode in the post-hypoxia is caused by ischemia. In a more particular embodiment, the ischemia is perinatal ischemia; preferably intrapartum neonatal ischemia.

The terms "perinatal ischemia" and "neonatal ischemia" are used herein interchangeably and refer to the ischemia occurring as a result of or during birth or a postnatal event.

In an embodiment, the hypoxia is perinatal hypoxia. In some embodiments, the fetal hypoxia is acute hypoxia, subacute hypoxia, evolving hypoxia and chronic hypoxia.

As used herein, the term "ischemia" is directed to a deficient supply of blood to a body part (such as the heart or brain) for example, due to obstruction of the inflow of arterial blood.

In a particular embodiment, the "perinatal ischemia" comprises low arterial partial pressure of oxygen or severe hypoxemia, respiratory or cardiac insufficiency, alone or in combination.

In neonates and preterm infants, hypoxia is detected by measuring $SpO_2$, oxygen desaturation index (DSI), measured by 3% and 4% desaturation (DSI 3%, DSI 4%), as well as by biochemical markers in preterm and full-term neonates such as hypoxanthine, xanthine, uric acid, xanthine oxidase, malondialdehyde, nitrotyrosine and lactate.

Perinatal hypoxia is typically measured in a nonspecific manner by cardiotocography (fetal heart monitoring). In case of suspicion, fetal blood scalp sampling is carried out discontinuously (1-3 times); blood samples are analyzed by blood gas analysis; based on one or more biochemical parameters, decision for cesarean section is taken. The biochemical analysis generally indicates perinatal metabolic acidosis as a consequence of a hypoxic event. In clinical practice, different parameters are used for the detection/diagnosis of hypoxia or acidosis, depending on countries, regions, and even hospitals. Most important parameters are
  pH of less than or equal to 7.2 (sometimes 7.0)
  Base deficit of at least 12 mmol/L in the scalp, the umbilical cord or the blood during the first hour of life
  Lactate levels>4.8 mM
  Lactate/creatinine ratio>0.64
  Combinations of pH and lactate
  Prognostic testing: EEG, aEEG, brain ultrasonography, MRI
  Biomarkers: The main biomarkers of injury used in blood or CSF have been neuron-specific enolase (NSE), the S100B protein (S100B), the glial fibrillary acidic protein (GFAP) and S100B in urine and the lactate/creatinine ratio. The determination of these biomarkers in blood, CSF or urine is used in some groups, but its predictive capacity can differ according to the biological fluid.

Diagnostic approaches for hypoxia after birth are largely based on nonspecific clinical criteria, such as Apgar score, umbilical cord pH and fetal heart-rate monitoring. The Apgar score includes 5 criteria, which are appearance, pulse, grimace, activity, respiration.

The term "subject" or "patient" typically includes humans, but can also include other animals such as, e.g., other primates, rodents, canines, felines, equines, ovines, porcines, and the like. In a preferred embodiment, the subject is a human subject of any sex, race or age. In a particular embodiment, the subject is a foetus (also termed fetus), pre-term neonate, term and post-term neonate, or children being less than one year old; particularly is a fetus.

The term "tissue" is understood as any tissue from humans, or from other animals such as, e.g., other primates, rodents, canines, felines, equines, ovines, porcines, and the like. In a particular embodiment, tissue is interpreted as skin. In an embodiment, the tissue is an isolated tissue from a subject or part of a subject.

Step (a)

Step (a) of the method of the invention is directed to collecting a Raman spectrum by contacting the tissue from the subject with a non-invasive Raman probe.

The collection of the Raman spectrum comprises directing light from a light source into the tissue of the subject via optical components defining a light path from said light source to a measurement location on the surface of the tissue or underneath the surface of the tissue , receiving Raman scattered light back from the tissue at a light detection unit via optical components defining a return path for Raman scattered light from said measurement location to said light detection unit, whilst using a tissue engaging member. In a particular embodiment, the tissue is skin. In an embodiment the measurement location is the surface of the tissue. In another particular embodiment, the light from the light source goes through the skin.

In a particular embodiment, the collection of the Raman spectrum comprises directing light form a light source to the tissue of the subject wherein the light has a spot size under 3.5 mm and/or a maximum emission power of 30 mW, particularly when the exposure time of the tissues over 10 s.

As used herein, the term "contacting" is directed to a non-invasive contact and includes any possible method that allows the interaction of a Raman probe and the tissue from the subject.

In a particular embodiment, the period of time contacting the tissue of the subject is between 1 and 20000 seconds, more preferably, between 100 and 18000 seconds, and more preferably, between 500 and 15000 seconds. In an embodiment the contact with the tissue is discontinuous or continuous; preferably continuous.

In a particular embodiment, the temperature at which the process of contacting the tissue from the subject takes place is between 15° and 40°C., more preferably, between 20° and 40° C., and more preferably, between 30° and 40°C. Any combinations of time and temperature as the ones specified herein are suitable for the contacting step of the method of the invention.

In a particular embodiment, the tissue of the subject is from any part of the body of the subject; preferably from the head; more preferably from the scalp of the subject, even more preferably is skin from the scalp of the subject.

As used herein, the expression "tissue from the scalp" is directed to the tissue covering the neurocranium (for example the skin covering the neurocranium).

As used herein, the term "cervical probe" is used to define a probe which is specially shaped to be applied across the uterine cervical canal and probe a woman's uterus or the fetus in case of a pregnant women.

In another particular embodiment, the non-invasive Raman probe is a cervical Raman probe.

As used herein, the term "Raman cervical probe" is used to define a probe which is specially shaped to be applied across the uterine cervical canal and probe a woman's uterus or the fetus in case of a pregnant woman and which allows the capture of a Raman spectrum from the surface which is in contact with the probe. Typically, the probe contains optical fibers for Raman scatter collection and a fiber for laser excitation, which could also be the same, and is connected to an excitation laser and spectrophotometer by optical fibers.

In the context of the present invention the term "non-invasive probe" relates to a probe which is applied to the surface of tissue of the subject under examination and which is able to detect a specific signal originating from the other side of the tissue but which does not require damaging, passing, entering, or penetration through the tissue, in particular through the skin.

In another particular embodiment, step (a) is performed during preterm development, labour or delivery, or during the postnatal period of up to one year; preferably during labour or delivery.

In another particular embodiment, step (a) is performed during preterm development.

In a more particular embodiment, step (a) is performed during labour or delivery and wherein the subject is a foetus. In some embodiments, step (a) is carried out by contacting a probe with the surface of the foetus during labour. In some embodiments, the contacting of the probe does not require damaging, passing, entering, or penetration through the tissue, in particular through the skin. In another embodiment, the contacting is carried out on a region of the skin of the neonate which has already left the birth canal, and which does not require inserting a cervical probe.

In another particular embodiment, step (a) is performed during the postnatal period of up to one year; wherein the subject is a child being less than one year old.

In an embodiment, the Raman probe is a near-infrared Raman spectroscopy probe; particularly comprising optical fibers and optomechanical elements as for example filters, lenses, aperture stops, GRIN lenses and others.

In an embodiment, the Raman spectrum, which is collected, is an average (median) of at least 2 repeated Raman spectra measurements on the same tissue area; preferably at least 5; more preferably at least 10; even more preferably at least 20.

In an embodiment, the Raman spectrum is a near-infrared Raman spectrum.

In some embodiments, the Raman spectrum is collected at near infrared wavelengths. In some embodiments, the Raman spectrum is obtained by excitation at a wavelength of between 600 and 1000 nm. In some embodiments, the Raman spectrum is collected at near infrared wavelengths and is obtained by excitation at a wavelength of between 600 and 1000 nm.

The term "near infrared", as used herein, refers to radiation in the near-infrared region of the electromagnetic spectrum, and having a wavelength of from 780 nm to 2500 nm, preferably 780 nm to 1600 nm.

In some embodiments, the Raman spectrum is not a Raman resonance spectrum. In some embodiments, the Raman spectrum is not collected at wavelengths between 380 and 460 nm. In some embodiments, the Raman spectrum is not obtained by excitation with a near UV wavelength.

In a more particular embodiment, the Raman spectrum is preprocessed. In particular, the preprocessing is carried out by:
  smoothing the Raman spectrum by applying a filtering technique; particularly a filtering technique selected from Savitzky Golay, Wavelets, Fourier-based filtering and a combination thereof; and/or
  subtracting a smoothed background signal from the Raman spectrum; preferably by applying asymmetric least squares (ALS), polynomial fitting, or derivatives; and/or
  applying a scatter correction; preferably by applying an extended multiplicative scatter correction (EMSC), peak normalization or ratio normalization; and/or
  applying a variable mean-centering method; preferably by translating the origin of the coordinate system to the center of gravity of the data; and/or
  performing a dimensionality reduction on the multivariable data set defining the Raman spectrum; wherein the dimensionality reduction is preferably carried out by a method selected from t-test, ANOVA, Pearson's correlation, forward or backward feature elimination, recursive feature elimination, Lasso and ridge regression, Random Forest, Principal Component Analysis (PCA), T-distributed Stochastic Neighbor Embedding (t-SNE), Uniform manifold approximation and projection (UMAP), Partial Least Squares (PLS) and combinations thereof; even more preferably by partial least squares (PLS) or PCA.

As used herein, the expression "partial least squares (PLS)" is directed to a multivariate regression technique known in the art used for supervised analysis and for the development of predictive regression models for chemical quantification that extracts a new set of orthogonal components, called latent vectors, that maximize the covariance between the observation matrix X and the response matrix Y by simultaneously decomposing them. As used herein, the expression "principal component analysis (PCA)" is directed to a mathematical method known in the art used for data compression while retaining most of the information, thus, the dimensionality of the data is reduced by projecting them in a new set of orthogonal independent variables, called principal components, which are linear combinations of the original variables. Therefore, principal components are arranged in descending order according to the direction of greatest variance, providing an insight into the amount of information they contain.

Step (b)

Step (b) of the method of the invention comprises identifying the subject as hypoxic, post-hypoxic or normoxic by a predictive model which correlates the multivariable data set of step (a) with representative data sets from spectra obtained from previously identified hypoxic subjects, post-hypoxic and normoxic subjects, said predictive model having been generated by training a computer with a plurality of Raman spectra from previously identified hypoxic, post-hypoxic and normoxic subjects by machine learning on said plurality of Raman spectra so as to obtain representative multivariable data sets associated with hypoxia, post-hypoxia and normoxia.

Typically, the representative data sets use at least 10, and more preferably 20, 25, 30 or more Raman spectra samples from hypoxic, post-hypoxic and normoxic subjects (control subjects). The data sets may derive from subjects with multiple different parameters such as gender, age, weight, national origin, etc.

In context of the invention, "control subjects" are one or more subjects who do not suffer from hypoxia (i.e., normoxic subjects) or who have not suffered from a hypoxia episode at least between 0.1 seconds and 10 hours before the Raman spectrum is collected. A subject is considered to not suffer from hypoxia if they have not been diagnosed with hypoxia by the diagnosis methods known in the art.

In another embodiment, "control subjects" are one or more subjects who do not suffer from post-hypoxia (i.e., subjects who have not suffered from a hypoxia episode at least between 0.1 seconds and 10 hours before the Raman spectrum is collected. A subject is considered to not suffer from post-hypoxia if they have not been diagnosed with hypoxia by the diagnosis methods known in the art.

In an embodiment, step (b) is performed by a machine learning method selected from a regression method, a classification method or a combination thereof.

It will be appreciated that the term "machine learning" generally refers to algorithms that give a computer the ability to learn without being explicitly programmed, including algorithms that learn from and make predictions about data. Machine learning algorithms employed by the embodiments disclosed herein may include, but are not limited to, random forest ("RF"), least absolute shrinkage and selection operator ("LASSO") logistic regression, regularized logistic regression, XGBoost, decision tree learning, artificial neural networks ("ANN"), deep neural networks ("DNN"), support vector machines, rule-based machine learning, and/or others.

For clarity, algorithms such as linear regression or logistic regression can be used as part of a machine learning process. However, it will be understood that using linear regression or another algorithm as part of a machine learning process is distinct from performing a statistical analysis such as regression with a spreadsheet program. Whereas statistical modeling relies on finding relationships between variables (e.g., mathematical equations) to predict an outcome, a machine learning process may continually update model parameters and adjust a classifier as new data becomes available, without relying on explicit or rules-based programming.

In a particular embodiment, step (b) is performed by a classification method, which results in identifying the subject as hypoxic, post-hypoxic or normoxic. If, on the other hand, step (b) is carried out by a regression method, the method of the invention results in the patient being assigned a score, which is indicative of the oxemic status and which belongs to a category from a manageable number of clinically meaningful categories.

In one embodiment, step (b) is carried out by a classification method; preferably selected from logistic regression, random forest, gradient boosting (GB), adaptive boosting (AB), extreme Gradient Boosting (XGB) k-nearest neighbors (kNN), artificial neural network (ANN), support vector machine (SVM), and combinations thereof.

In an embodiment, the predictive model is generated by training the computer with a plurality of Raman spectra from previously identified hypoxic, post-hypoxic and normoxic subjects by machine learning on said plurality of Raman spectra so as to obtain representative multivariable data sets associated with hypoxia, post-hypoxic and normoxia; wherein the training comprises the following steps:
(i) training data, from a plurality of Raman spectra, is randomly stratified into:
a calibration dataset (particularly in a percentage of 75%), and
a validation dataset (particularly in a percentage of 25%);
(ii) the predictive model is seeded on the calibration dataset (particularly is developed by applying a machine learning method selected from a regression method, a classification method or a combination thereof on the calibration dataset);
(iii) the predictive model is optimized by an internal cross validation; preferably by a k-fold cross validation, wherein each of the k cases of the k-fold cross validation is used for testing only once and one at a time; and
(iv) the predictive model is further validated by predicting new samples using the validation dataset.

In a particular embodiment, step (b) is performed by a regression method; preferably selected from multiple linear regression (MLR), principal component regression (PCR), partial least squares regression (PLSR), artificial neural network (ANN), support vector machine (SVM), random forest (RF), lassor regression, ridge regression and combinations thereof.

In a particular embodiment, step (b) is performed by a regression method which includes the value of one or more variables of the Raman spectrum collected in step (a) and which contributes to the identification of the subject as hypoxic, post-hypoxic or normoxic subject.

The variables that can be analyzed in step (b) are not particularly limitative to the invention as long as they can be used to discriminate the subjects based on the hypoxic or oxemic status using either a classification method or a regression method. Suitable variables that can be obtained from a Raman spectrum and that can be used in the multi-variable analysis according to the invention include: peak area, peak intensity, peak intensity ratios or area ratios, first and higher derivatives, wavelength shift as well as variables that are detected after processing the spectra by deconvolution.

In an embodiment, the subject is hypoxic when it has suffered a hypoxia episode between 0.1 seconds and 10 hours before the Raman spectrum is collected; preferably wherein the subject has suffered a hypoxia episode between 1 second and 3 hours before the Raman spectrum is collected.

In an embodiment, the subject is post-hypoxic when has suffered a hypoxia episode between 0.1 seconds and 10 hours but has recovered from the hypoxia between 1 min and 4 hours before the Raman spectrum is collected; preferably wherein the subject has suffered a hypoxia episode between 1 seconds and 3 hours and has recovered from the hypoxia between 5 seconds and 2 hours before the Raman spectrum is collected.

Device

In a second aspect the invention relates to a device for carrying out a method as defined in any of the particular embodiments of the invention which comprises:
i) a non-invasive Raman probe,
ii) a Raman spectrometer comprising a light source, which is fiber-coupled to the Raman probe,
iii) a computer containing instructions, which cause the computing system to carry out the method according to any of the embodiments of the invention.

In another particular embodiment, the non-invasive Raman probe of (i) is a cervical Raman probe.

In particular embodiments the Raman spectrometer that is used in step (ii) comprises:
at least one Raman excitation light source for Raman excitation,
at least one photodetector configured for collecting signals with a wavelength comprised at least in the Raman spectrum,
a wavelength-dispersive device, such as a spectrometer, for the collected Raman signals,
excitation optical components, and collection optics comprising a first collection lens.

In a particular embodiment, the collection optics further comprise a lens system, filters, and a beam splitter.

In a particular embodiment, the at least one Raman excitation light is a laser; preferably a continuous wave diode laser.

In a more particular embodiment, the at least one Raman excitation light emits at a wavelength between 600 and 1100 nm; preferably between 700 and 800 nm; more preferably at about 785 nm. In some embodiments, the collection optics collect the Raman spectrum at near infrared wavelengths.

In some embodiments, the Raman spectrum is not a Raman resonance spectrum. In some embodiments, the collection optics do not collect at wavelengths between 380 and 460 nm. In some embodiments, the at least one Raman excitation light does not emit at near UV wavelength.

In another embodiment, the at least one Raman excitation light has an emission power between 1 and 300 mW; preferably between 10 and 200 mW; more preferably between 20 and 150 mW.

In a particular embodiment, the at least one Raman excitation light has an emission power of less than 150 mW; preferably less than 100 mW; more preferably less than 50 mW, even more preferably less than 30 mW.

As will be appreciated by one of skill in the art, the device according to the invention contains a computer containing instructions, which cause the computing system to carry out the method according to the invention. The device may take the form of an entire hardware embodiment or an embodiment combining software and hardware aspects. Furthermore, the present invention may include a computer program product on a computer-usable storage medium having computer-usable program code means embodied in the medium. Any suitable computer readable medium may be utilized including hard disks, CD-ROMs, optical storage devices, or magnetic storage devices. The computer-usable or computer-readable medium may be or include, for example, but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM), a CD ROM, a DVD (digital video disk), or other electronic storage medium. Note that the computer-usable or computer-readable medium could even be paper or another. Suitable medium upon which the program is printed, as the program can be electronically captured, via, for instance, optical scanning of the paper or other medium, then compiled, interpreted or otherwise processed in a suitable manner if necessary, and then stored in a computer memory.

Computer program code for carrying out operations of the present invention may be written in an object-oriented programming language such as Python, Matlab, JavaE, smalltalk or C++. However, the computer program code for carrying out operations of the present invention may also be written in conventional procedural programming languages, such as the "C" or FORTRAN programming language or even assembly language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Use of the Device

In a third aspect, the invention relates to the use of the device of the invention, for determining hypoxia or post hypoxia in a subject. In some embodiments, the device is used for the determination of hypoxia during labour/delivery and wherein the subject is a foetus.

All the terms included in the use of the device of the invention have been previously defined.

Methods of Therapy for Hypoxic Subjects

The present invention also provides a method for the detection and treatment of hypoxia or post-hypoxia in a subject that comprises the steps of:
(i) non-invasively determining hypoxia or post-hypoxia in a subject by:
  (a) collecting a Raman spectrum by contacting the tissue from the subject with a non-invasive Raman probe thereby obtaining a multivariable data set that represents the Raman spectrum from the subject; and
  (b) identifying the subject as hypoxic, post-hypoxic or normoxic by a predictive model that correlates the multivariable data set generated in step (a) with representative data sets from spectra obtained from previously identified hypoxic, post-hypoxic and normoxic subjects,
  said predictive model having been generated by training a computer with a plurality of Raman spectra from previously identified hypoxic, post-hypoxic and normoxic subjects by machine learning on said plurality of Raman spectra so as to obtain representative data sets associated with hypoxia, post-hypoxia and normoxia and
(ii) treating those subjects identified as hypoxic with a therapy suitable for the treatment of hypoxia.

Particular treatments that may be applied in embodiments of the invention include supplemental oxygen therapy, transfusion of packed red blood cells, caffeine, vitamin therapy, mechanical ventilation, positive pressure therapy, physical exercise, and surgical intervention (e.g. alleviation of airway obstruction or tracheotomy). Those of skill in the art will appreciate that these may be direct treatments for chronic hypoxia and/or for a condition identified or suspected as a primary cause of chronic hypoxia (e.g., obstructive pulmonary disease). Primary or underlying causes of chronic hypoxia may include chronic obstructive pulmonary disorder, airway obstruction, acute respiratory distress syndrome, pneumonia, pneumothorax, emphysema, congenital heart defects, pulmonary embolism, pulmonary edema, asthma, cystic fibrosis and high altitude.

In the case of perinatal hypoxia (i.e. oxygen deficiency in the tissues immediately before and after birth), then neonatal therapeutic hypothermia can be applied to the newborn.

In the case of post-hypoxia, the subject may be treated with provision of adequate ventilation to avoid new episodes of hypoxemia, hyperoxia, hypercapnia or hypocapnia, drugs adequate for maintaining adequate blood pressure and heart beat, administration of fluids and electrolytes to maintain adequate levels, administration of maintenance of glucose to maintain adequate glucose levels, antibiotic administration, administration of antiepileptic drugs to prevent, reduce or stop epileptic events, including myoclonus (post-hypoxic myoclonus or PHM), such as phenytoin, phenobarbitone, and benzodiazepines. If these efforts are ineffective in the treatment of acute PHM, anesthesia agents, propofol or L-5-hydroxytryptophan (L-5-HTP) should be considered. Due to the wide range of clinical manifestations that a hypoxic episode may present itself with, the treatment of the post-hypoxic event will depend greatly on said clinical manifestations and the trained physician will know which treatment to provide and the best method to provide said treatment.

The invention is explained below by way of the following examples, which are to be construed as merely illustrative and not limitative for the scope of the invention.

EXAMPLES

Experimental Section

All experimental procedures and euthanasia of the animals were conducted in strict compliance with European and Spanish regulations on the protection of animals used for scientific purposes (European Directive 2010/63/EU and Spanish Royal Legislative Decree 53/2013). The protocols were approved by the Committees on the Ethics of Laboratory Animal Welfare of relevance, according to the animal facility where specific experiments were carried out.

Example 1: Determination of Lactate Concentration and pH in Human Blood by Raman Spectroscopy A. Sample Preparation To study the influence of pH and lactate variations on Raman spectra, two types of samples were used:
  phosphate-buffered saline (PBS, 10010015, Thermo Fisher Scientific) and
  blood from the jugular vein of domestic pigs.

Blood collection bags with anticoagulants (CPDA-1 for improved storage up to 35 days and CPD-SAGM for storage of red blood cell concentrate up to 42 days) were used. After extraction, the blood was stored at 4° C.

Firstly, Raman spectroscopic measurements were carried out with PBS samples to demonstrate proof-of-principle and then, blood samples were analyzed. pH values of the samples were changed by adding diluted (1 M) sodium hydroxide (NaOH, S5881, Sigma-Aldrich) or diluted (10%) hydrochloric acid (HCl, H1758, Sigma-Aldrich). Sodium L-Lactate (71718, Sigma- Aldrich) was used for lactate variation. All the measurements were carried out at room temperature (23° C.). 88 PBS samples and 16 blood samples were prepared to analyze the influence of pH variations. To study the influence of lactate, 90 PBS samples and 12 blood samples with different lactate concentrations were used.

B. Near-Infrared Raman Spectroscopy pH and lactate variations in liquid samples were studied by near-infrared Raman spectroscopy. Near-infrared Raman spectroscopy is an inelastic scattering technique that relies on the interaction of monochromatic near-infrared light with specific vibrational modes of molecules. The scattered light shows a shift in energy, the so-called Raman effect, which is characteristic for specific functional groups, thus providing valuable information about the sample to be analyzed as a biological fingerprint.

A customized Raman spectroscopy system was built up such that the laser beam hits the sample from below (inverted microscope). Said Raman system comprised (a) a Raman probe, (b) a Raman spectroscopy system including a laser in the near-infrared (for example 785 nm), optical components as lenses, filters, pinholes and others, a spectrometer and a detector, and (c) a computer for data acquisition and analysis.

Liquid samples of 250 µL were deposited in a well on a fused silica substrate due to its low fluorescence at 785 nm. This configuration allows easy and unambiguous focusing into the sample without getting affected by evaporation on top of the droplet. A continuous wave diode laser emitting at 785 nm with an emission power of 115 mW was used for excitation; Raman scattered light was collected by a grating spectrometer (EAGLE Raman-S with Andor iVac 316 detector, Ibsen Photonics) with a spectral resolution of 4 $cm^{-1}$. Depending on the sample, acquisition parameters were adapted for optimizing signal-to-noise and avoiding bleaching and temperature effects.

C. Pre-Processing of Raman Data

Collected Raman spectra were preprocessed as follows:
1) Cosmic ray features: Detectors of Raman systems are generally sensitive to cosmic rays that sporadically produce spike artifacts in the raw spectra. In this study, cosmic ray features were removed by taking the median of several measurements from the same sample.
2) Noise reduction: Raman spectra are often affected by high frequency component artifacts, known as background noise. In this study, all spectra have been smoothed by applying a Savitzky-Golay filtering technique with 5 points and 3rd order polynomials.
3) Fluorescent background: Intrinsic fluorescence of molecules, often more intensive than the Raman peaks themselves, can strongly impede a correct analysis of the sample. In consequence, a corrected Raman signal was obtained by subtracting a smoothened background signal from the spectra by means of the asymmetric least squares (ALS) method as state-of-the-art approach [P. H. Eilers and H. F. Boelens, "Baseline correction with asymmetric least squares smoothing," Leiden University Medical Centre Report, vol. 1, no. 1, p. 5, 20051.]. Unlike ordinary least squares, ALS gives priority to positive residual errors to guarantee the integrity of Raman peaks.
4) Extended multiplicative scatter correction (EMSC): Physical events, as light scattering, can also cause multiplicative effects or scattering artifacts, such as fluctuating background. Even though such artifacts disruptively affect the interpretation of Raman spectra, EMSC allows to get rid of those varying interfering features. The multiple scatter corrected spectra are obtained by regression analysis of each spectrum against the mean spectrum of the whole data set. EMSC extends linear regression to multiple regression with additional non-linear terms to adequately model the chemical variability of the spectra [T. Fearn, "Extended multiplicative scatter correction," NIR news, vol. 16, no. 4, pp. 3-5, 2005.]. An open EMSC toolbox for MATLAB was used for Raman spectra pre-processing in that regard [K. H. Liland, A. Kohler, and N. K. Afseth, "Model-based preprocessing in Raman spectroscopy of biological samples," Journal of Raman Spectroscopy, vol. 47, no. 6, pp. 643-650, 2016.].
5) Variable mean-centering: Since most of the methods are based on the variance of specific features of data, it is important to center the data relative to a reference point, which in this case is the mean. Translating the origin of the coordinate system to the center of gravity of the data avoids uncertainties of the variance of the mean [B. M. Wise, N. Gallagher, R. Bro, J. Shaver, W. Windig, and R. S. Koch, "Pls toolbox 4.0," Eigenvector Research Incorporated: Wenatchee, WA, USA, 2007.].

D. Multivariate Data Analysis and Model Development

Raman spectroscopy generates data of wide spectral range resulting in thousands of variables to be handled. Moreover, significant details often depend on (non)linear correlations among different variables. Thus, multivariate analysis was employed in a MATLAB environment.
1) Principal Component Analysis (PCA): PCA is a mathematical method used for data compression while retaining most of the information. The dimensionality of the data is reduced by projecting them in a new set of orthogonal independent variables, called principal components, which are linear combinations of the original variables. Principal components are arranged in descending order according to the direction of greatest variance, providing an insight into the amount of information they contain [R. Gautam, S. Vanga, F. Ariese, and S. Umapathy, "Review of multidimensional data processing approaches for Raman and infrared spectroscopy," EPJ Techniques and Instrumentation, vol. 2, no. 1, pp.1-38, 2015]. Since PCA is an unsupervised method and does not require any prior knowledge of the data, its discrimination and quantification power are limited.

In this study, PCA was used for an adequate representation of the data in fewer variables than the original ones, when the amount of data available to develop a regression model was insufficient. Moreover, it was used to detect systematic patterns or to verify clustering of sample features due to pH/lactate variations.

In particular, principal component analysis (PCA) was applied to training data sets obtained from Raman spectra from blood samples with different pH values. 16 samples with pH values within the physiological range from 6.9 to 7.5 were prepared, i.e., four samples per pH value. As shown in FIG. 1 (a), PCA analysis on training data sets was able to differentiate between clusters of various pH values. Training data sets from Raman spectra from blood samples with different lactate concentrations were analyzed by PCA. Results are shown in FIG. 1 (b). Results show that PCA was able to separate clusters of data of different pH values and lactate concentrations measured in blood samples by Raman spectroscopy.

2) Partial Least Squares (PLS): PLS is a powerful multivariate regression technique used for supervised analysis and for the development of predictive regression models for chemical quantification. The main goal of PLS is the prediction of a set of responses Y, as a matrix of outcomes, from a set of predictors X, the matrix of observations. Similar as in PCA, PLS extracts a new set of orthogonal components, called latent vectors, in the direction of maximum variance that simultaneously decomposes the data. Unlike PCA, PLS additionally maximizes the covariance between the predictor and response matrices at the same time [R. D. Tobias et al., "An introduction to partial least squares regression," in Proceedings of the twentieth annual SAS users group international conference. SAS Institute Inc Cary, 1995, pp. 1250-1257].

In this context, PLS was used to define a predictive model that determines the relationship between pH or lactate variations and Raman spectroscopy data for calibrating absolute values.

3) Evaluation of the PLS regression model: The performance of predictive models based on machine learning algorithms, such as those resulting from PLS, was evaluated. At first, the prediction model is formed from a training set of measurement data, then it needs to be validated from new testing sets.

For the experiments in PBS, one measurement per condition (lactate concentration or pH value) was included into the testing set, while all the rest represented the training set.

For all experiments, the predictive model was calibrated with the training set by the leave one-out cross-validation (LOOCV) method to firstly determine an optimum set of latent vectors, and hence, avoiding overfitting. Since the number of samples was limited, each individual measurement was tested against the training set consisting of all other measurements excluding the one under test.

The rms (root mean square) error of cross-validation (RMSECV), indicator of the quality of the predictive model, was obtained by summing up and averaging all squared differences between the predicted and the real value of each measurement taken out from the training set. By varying the number of latent vectors, a minimum for the error RMSECV can be found. With that optimized number of latent vectors, the rms error of prediction (RMSEP) for both the complete training set as well as new testing sets, examined with the training set, was calculated as additional supporting parameter of the performance of the predictive model [B. M. Wise, N. Gallagher, R. Bro, J. Shaver, W. Windig, and R. S. Koch, "Pls toolbox 4.0," Eigenvector Research Incorporated: Wenatchee, WA, USA, 2007.].

Results

The PLS regression predictive model obtained for the relationship between pH or lactate variations and Raman spectroscopy data showed a high correlation between the real and the predicted values. FIG. 1 shows the prediction of (a) pH and (b) lactate concentration values by optimized PLS regression mode in blood samples based on Raman data obtained from blood samples. For blood samples from domestic pigs with varying pH values, the rms error of prediction (RMSEP) was 0.02 pH units with a coefficient of determination $R^2$=0.990 for the linear regression model. For blood samples of different lactate concentrations, an RMSEP of 0.20 mM with $R^2$=0.998 was obtained.

Thus, results show that pH values and lactate concentrations in blood can be successfully measured in vitro by Raman spectroscopy.

Example 2: Determination of Hypoxia-Ischemia by Raman Spectroscopy in Samples of Solid Tissue A method for ex vivo determination of concentrations of physiological lactate concentrations and pH values based on Raman measurements of solid samples was developed.

Several solid samples from skin tissue from the scalp of domestic pigs having different lactate concentrations were prepared. Then, ex vivo Raman measurements were carried out on the samples to obtain a training data set. The Raman training data set was pre-treated and principal component analysis (PCA) was applied to said data set.

A. Sample Preparation 24 solid samples from tissue from the scalp of domestic pigs were prepared as follows: fragments of tissue of 5×5 cm² were immersed in William's Medium supplemented with 1% Penicillin/Streptomycin, 1% L-Glutamin, 10 ng/ml hydrocortisone and 10 ng/ml Insulin comprising no lactate (control) or two different lactate concentrations (10 or 50 mmol) at 37° C. during about 30 min. Sodium L-Lactate (71718, Sigma-Aldrich) was used for lactate variation.

Figure 3:
FIG. 3. Tissue solid samples from the scalp of domestic pigs with different lactate concentrations.

FIG. 3 shows tissue solid samples from the scalp of domestic pigs with different lactate concentrations.

B. Near-Infrared Raman Spectroscopy

Lactate variations in solid samples were studied by near-infrared Raman spectroscopy using the customized Raman spectroscopy system described in Example 1. Raman spectra were taken from the solid samples described above. All Raman measurements were carried out at room temperature (23° C.).

C. Pre-Processing of Raman Spectra Collected Data

The collected Raman data from solid samples was pre-processed before being analyzed as described in Example 1.

Figure 4:
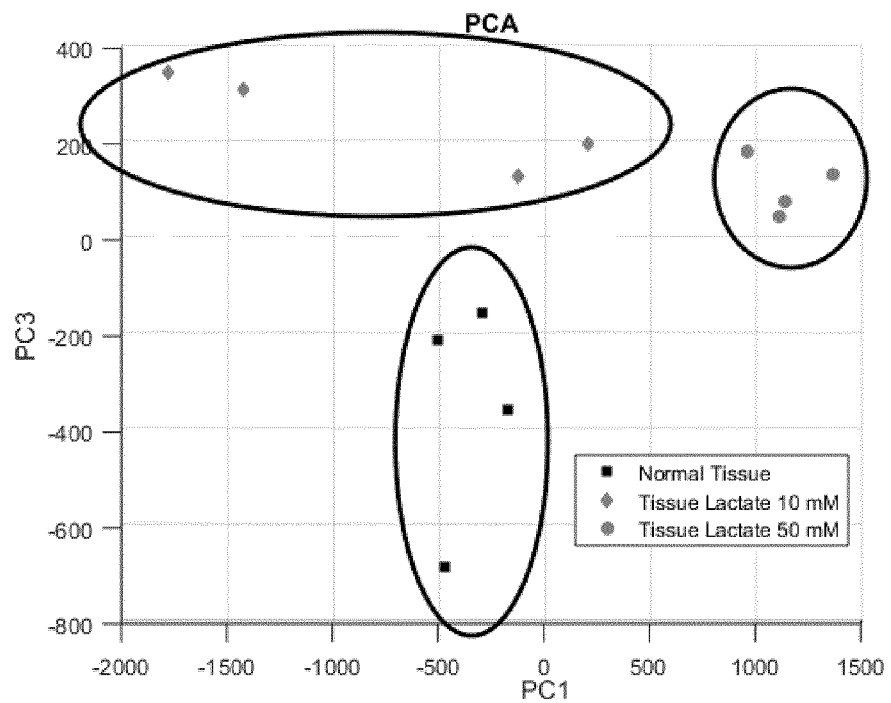
FIG. 4. PCA of Raman spectra data sets obtained from the solid tissue samples.

Principal component analysis (PCA), as described in Experiment 1, was applied to data sets obtained from the Raman spectra of the 24 solid samples with different lactate concentrations. FIG. 4 shows principal component analysis of Raman spectra data sets obtained from the solid tissue samples shown on FIG. 3.

Results showed that different lactate concentrations can be successfully measured by Raman spectroscopy from solid tissue samples. In addition, by applying PCA, the lactate concentration values were separated, and clustering of different physiological states could be observed. For example, certain lactate concentrations may be associated to HI episodes.

Example 3: In Vivo Detection of Hypoxia Conditions in Animal Model by Machine Learning Assisted Raman Spectroscopy A model for the detection of hypoxia in a subject is developed by machine learning and Raman spectroscopy. This model can be applied continuously or discontinuously in vivo or in vitro. The present example describes an HI experiment where Raman spectra are recorded and compared with blood gas analysis.

Figure 5:
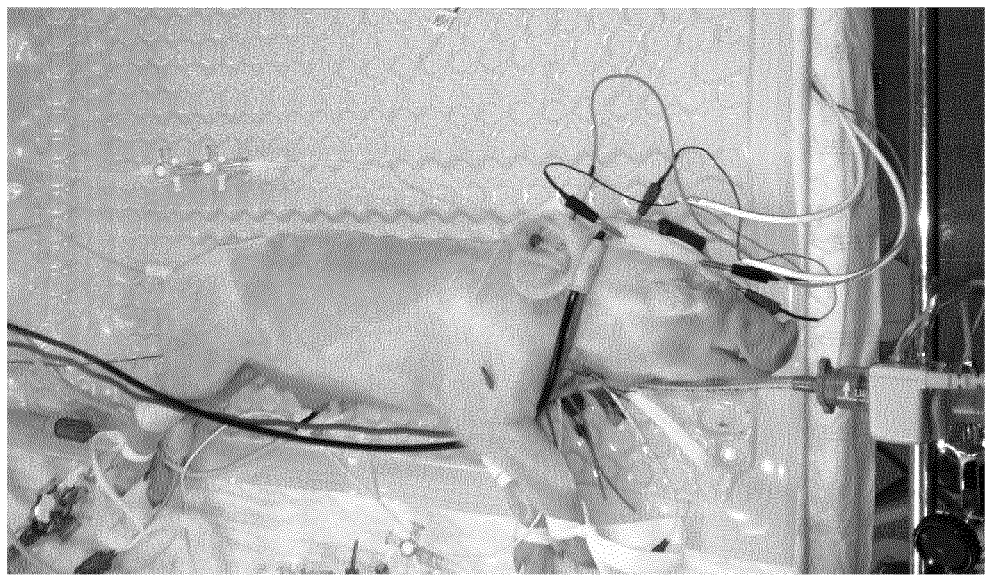
FIG. 5. Pig in the operating theater during in vivo experiment.

Piglets 1 to 3 days old are anesthetized, intubated, and ventilated by positive pressure (FIG. 5). Continuous ECG, transcutaneous pulse oximetry and corporal temperature is recorded. First, normoxic conditions are induced (arterial partial pressure of oxygen (PaO2): 80-100 mmHg; arterial partial pressure of carbon dioxide (PaCO2): 35-45 mmHg; pH: 7.35-7.45). Then, hypoxia-ischemia is induced by clamping both carotid arteries with vascular occluders and lowering $FiO_2$ (fraction of oxygen in the inhaled air) to 8-10% over 30 min. At the end of hypoxia-ischemia, carotid blood flows were restored, and the inspired fraction of oxygen was returned to 21%.

Raman spectra are taken by means of a fiber-coupled Raman probe at different locations of the body tissue of the animal, as the tongue, the abdomen skin, and the snout skin.

Both biochemical analysis of blood and Raman spectra are taken at different times since the HI event (before, during and after). The physiological parameters include pH, lactate, temperature, glucose, base excess, hemoglobin derivatives, oxygen saturation, partial pressure of oxygen and $CO_2$, among others.

Biochemical analysis of blood and Raman spectra are taken before inducing HI, immediately after the HI episode and at several time stamps until at least 60 min after the HI episode.

The predictive model is generated by training a computer with a plurality of Raman spectra from previously identified hypoxic and normoxic subjects by machine learning so as to obtain representative data sets associated with hypoxia and normoxia; wherein the training comprises the following steps:

(i) training data, from a plurality of Raman spectra, is randomly stratified into:
  a. a calibration dataset, and
  b. a validation dataset;
(ii) the predictive model is seeded on the calibration dataset;
(iii) the predictive model is optimized by an internal k-fold cross validation, wherein each of the k cases is used for testing only once and one at a time; and (iv) the predictive model is further validated by predicting new samples using the validation dataset.

To build up statistically relevant data bases for developing reliable classification models, and if possible, regression models, at least 20 pigs are used to obtain a plurality of Raman spectra. Random sets of around 70-80% of the Raman spectra will be used as training set (calibration sets) for developing multivariable classification and regression models by machine learning algorithms.

The Raman spectra used as calibration sets are preprocessed as described in the previous examples (input variables for machine learning algorithms are determined and pretreated as described in the previous examples). Several machine learning algorithms and combinations of them are tested for achieving best performance of the predictive model.

The classification and regression models are tested by the rest of the data (validation dataset). Figures of merit are, but not exclusively, accuracy, precision, sensitivity, and specificity.

Example 4: In Vivo Validation of the Method According to the Invention

Materials & Methods

Animal Preparation & Experimental Procedure

Animal preparation. All experimental procedures and euthanasia of the animals were conducted in strict compliance with European and Spanish regulations on the protection of animals used for scientific purposes (European Directive 2010/63/EU and Spanish Royal Legislative Decree 53/2013). The protocols were approved by the Committees on the Ethics of Laboratory Animal Welfare of Biodonostia Health Research Institute (Permit Numbers: OH 18_22 and OH 20_36) and performed in its experimental surgical theater. Piglets 1 to 3 days old were anesthetized with sevoflurane (Induction 5% and maintenance 2.5%) and fentanyl (0.0002-0.0005 mg/kg/h), and then paralyzed by a perfusion of vecuronium (1.8 mg/kg/h) administered through an ear vein. Animals were then tracheostomized and ventilated by positive pressure. The femoral artery was cannulated to monitor blood pressure and to obtain blood samples. Blood oxygen saturation was monitored by transcutaneous pulse oximetry.

Experimental procedures. After stabilization, the animals were kept under normoxic conditions for 1 hour. The induction of hypoxic-ischemic damage was carried out by reducing the inspiratory oxygen fraction between 8-10% until reaching a base excess concentration of $c_{BE} \leq -15$ mmol/l and/or a pH$\leq$7 and/or a lactate concentration of $c_{lac} \geq 12$ mmol/L (moderate-severe hypoxic-ischemic damage). In addition, a mean arterial pressure <20 mmHg was established as an end point criterion for hypoxia, since in these cases the life of the animal is seriously compromised. To reduce the inspiratory fraction of oxygen below 21%, the ventilation system was modified, replacing the medical air supply with nitrogen and readjusting oxygen concentrations with an oximeter. In addition, $CO_2$ was administered in the inspiratory fraction (PaCO$_2$ 8.0-9.5 kPa), with the aim to mimic perinatal asphyxia. After hypoxic damage, the inspired oxygen fraction was restored to baseline levels and kept for 1 hour. For the hypoxia-ischemia experiments, three intervals were established:

Baseline condition (60 minutes)
Hypoxia-ischemia (The mean duration of hypoxic-ischemic damage was around 40-50 minutes)
Post hypoxia-ischemia (60 minutes)

Throughout the experiment, blood samples were continuously drawn for analysis.

Acquisition of Raman Spectra

Raman measurements are performed with the Raman-Probe™ (RPS785, InPhotonics), which has been adapted to be used in contact with the skin. The integration of an optomechanical module enables the adjustment of the position of the focus to the outer surface and optimization of the Raman signal. Measurements are carried out in the upper surface of the tongue. The Raman probe, with an excitation fiber of 105 nm core and a collection fiber of 200 nm, is connected to a continuous wave diode laser, emitting at 785 nm with an emission power of 60 mW, and to a grating spectrometer (EAGLE Raman-S with Andor iVac 316 detector, Ibsen Photonics), with a spectral resolution of 4 cm$^{-1}$, to collect the backscattered Raman light. All spectra have been independently recorded by replacing the probe for each measurement and integrating for 60 s.

Preprocessing of Raman Signal

Analysis of Raman data in biological samples is extremely challenging due to their heterogeneous nature. Unwanted contributions caused by different background and noise sources can hide weak Raman signals from the sample under test. Therefore, prior to develop any predictive model, preprocessing of raw Raman data is essential for a correct interpretation of the Raman spectra and for a reliable classification of the samples. Hence, all Raman spectra were first trimmed to the spectral range from 522 cm$^{-1}$ to 1717 cm$^{-1}$, the so-called fingerprint region. Then, a 6th order Extended Multiplicative Signal Correction (EMSC) was applied to the raw spectra to remove interfering additive and multiplicative artifacts by scaling all the Raman spectra to the mean spectrum [1]. An asymmetric least squares (ALS) method, based on Whittaker filter, was used to subtract a smoothed background produced by the intrinsic fluorescence of the molecules [2]. The integrity of the Raman bands is retained by giving higher relevance to positive residuals [3]. All Raman spectra were smoothed using a Savitzky-Golay filter with a window of 15 points and 3rd order polynomials for a spectral sampling at 3.7 cm$^{-1}$. Finally, to avoid uncertainties of the variance of the mean, the origin of the coordinate system is translated to the center of gravity of the dataset. Some machine learning algorithms are built upon the variance of specific features of data, then, it is important to center the data relative to a reference point, which in this case is the arithmetic mean.

Development of Predictive Models

Multivariate analysis simultaneously evaluates various parameters and identifies existing correlations. Machine learning algorithms, based on multivariate analysis and characterized by their capacity to learn and adapt to new situations, aim at developing predictive models [4]. The correct extraction of significant features within thousands of misleading, correlated, and redundant variables to be handled remains a major challenge. The high number of variables, or pixels in this case, obtained by Raman spectroscopy, can lead to overfitting, impeding the model to generalize. Machine learning is used to reliably identify and model the spectral variability from preprocessed spectra [3, 5]. Moreover, these models give insight into inner correlations between Raman features and quantify their significance. The adaptive abilities of machine learning algorithms mitigate the impact of outliers and allow for better modeling of the variability of the data. So far, partial least squares-discriminant analysis (PLS-DA) has been used for identification of hypoxic-ischemic events [6]. PLS seeks new latent variables that maximize the covariance between X, the matrix of observations, and Y, the matrix of outcomes [7, 8]. Redundant or irrelevant features are removed by projecting the data in a new reduced subset of latent vectors sorted by the amount of explained variance and extracted from combinations of the original features. Despite being initially introduced for regression to handle continuous variables, PLS also evolved for classification purposes. In PLS-DA, output categorical variables are recoded into discrete numbers, typically 0 and 1. Due to the inherent function of PLS, resulting predictions will produce continuous values close to these two integers. Class membership is determined according to an appropriately set cut-off threshold.

Instead of following the common procedure of splitting the data into an arbitrary calibration and validation dataset, predictive models were built and optimized according to the leave one subject-out cross validation (LOSOCV) method, due to limited statistics (number of in vivo experiments n=8), where 'subject' stands for each individual pig. To avoid bias caused by introducing spectra belonging to one same pig in both calibration and validation datasets by random selection or other type of cross validation method, n-folds (with n as the number of pigs) are defined. The model is trained with n−1 pigs to predict the nth pig which is used for validation. The process is repeated n times, until the spectra from each pig have been predicted once. Model parameters are optimized by minimizing the total classification error. This procedure allows for simulation of real prediction of new unknown data and resembles real-life scenarios.

Results

Basal Condition vs. Hypoxia-Ischemia

Figure 6:
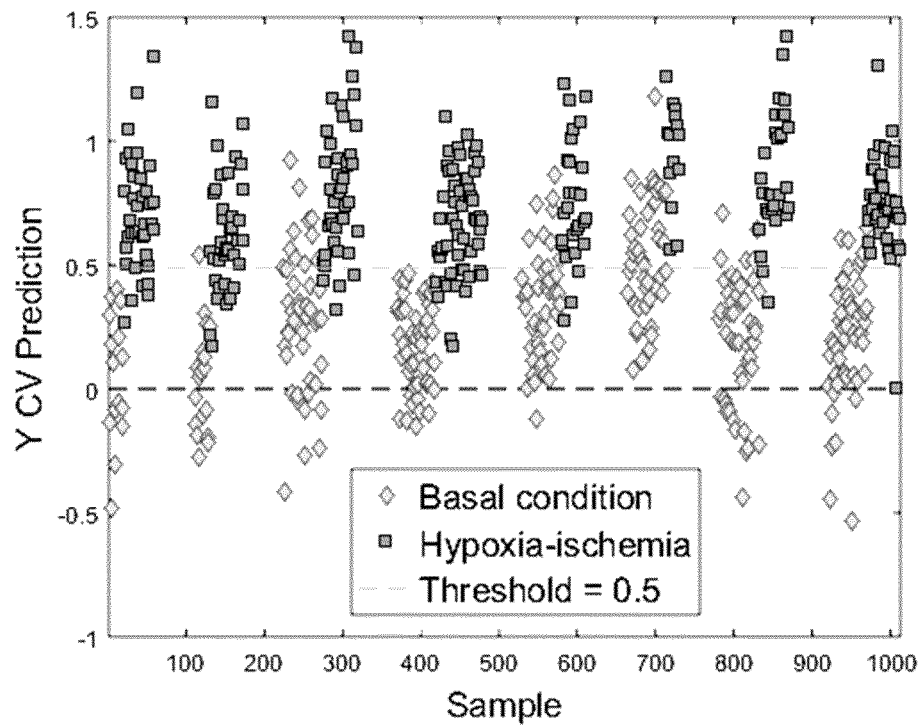
FIG. 6: a) Classification of basal vs. hypoxia ischemia condition based on partial least squares-discriminant analysis (PLS DA). b) 3D scores plot of partial least squares (PLS).
Figure 6:
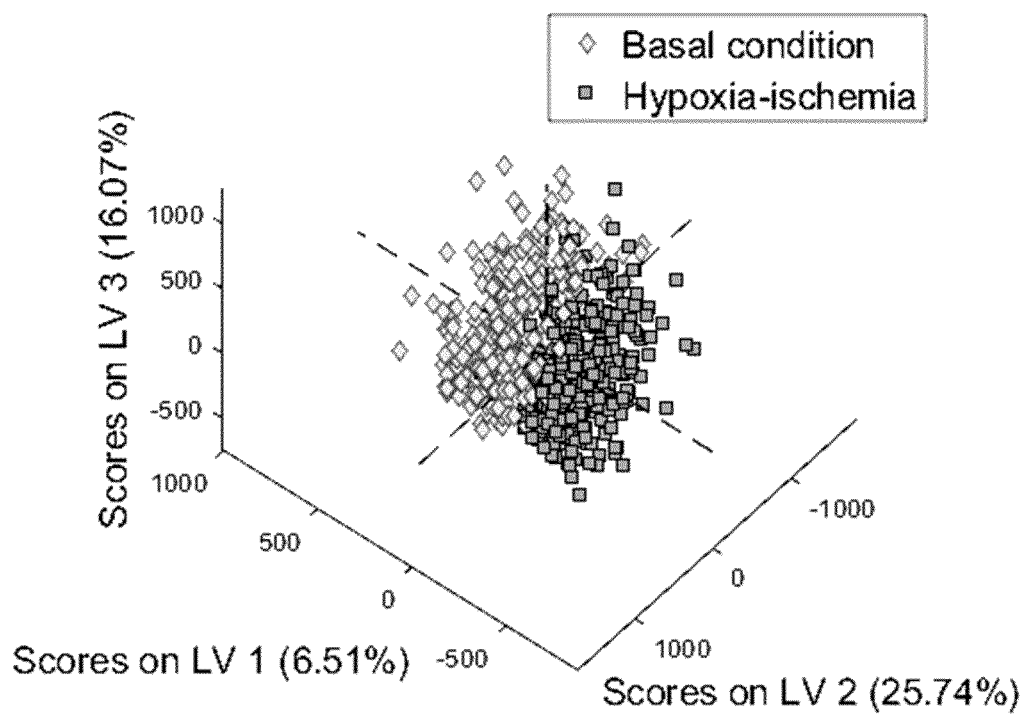

FIG. 6 demonstrates how the hypoxic state can be distinguished from the basal condition applying machine learning algorithms to Raman spectra. The spectra were taken from 8 pigs at the tongue, the protocol for animal treatment, measurement technique, data acquisition, and data analysis follows the protocols described above.

FIG. 6 (a) illustrates the quantitative classification of basal vs. hypoxia-ischemia condition based on partial least squares-discriminant analysis (PLS-DA). A sensitivity of 86.5% and a specificity of 81.6% is achieved by cross-validated prediction with a discriminant threshold of 0.5. Optimum number of latent vectors (n=4) is obtained by leave-one-subject-out cross-validation (LOSOCV).

FIG. 6 (b) shows a qualitative classification of basal vs. hypoxic-ischemic state by a 3-D scores plot of partial least squares (PLS). Projection of the spectral data in a new latent space that maximizes the covariance with respect to the clinical state (basal vs. hypoxia-ischemia) shows a clear differentiation between the two different conditions.

Basal Condition vs. Post Hypoxia-Ischemia

Figure 7:
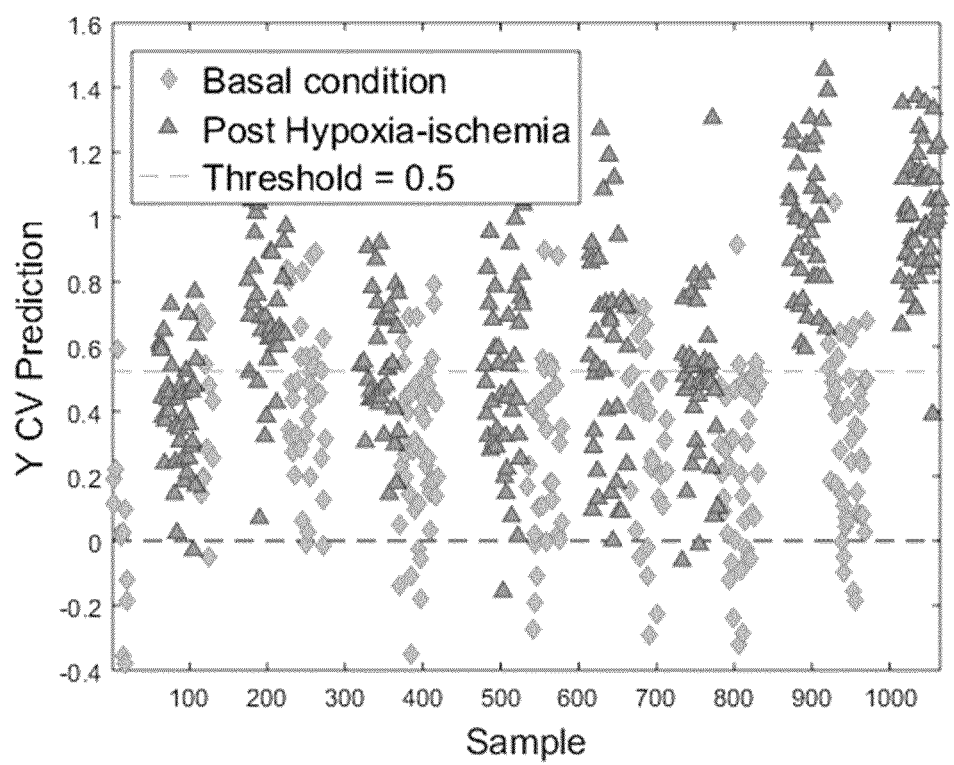
FIG. 7: a) Classification of basal vs. post hypoxia ischemia condition based on partial least squares-discriminant analysis (PLS DA) b) 3 D scores plot of partial least squares (PLS).
Figure 7:
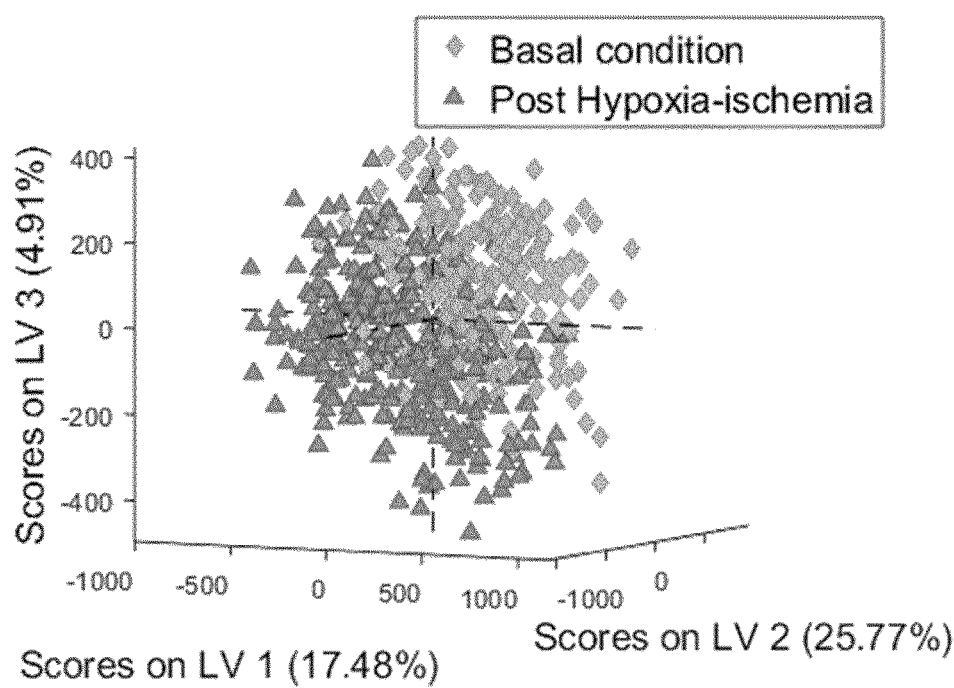

FIG. 7 represents the same figures and methods as FIG. 6, only the medical indications have changed, and basal condition is compared to the post hypoxic-ischemic stage. The sensitivity achieved is 65.7% and the specificity 80.5%, again for cross-validated prediction with a discriminant threshold of 0.5. Optimum number of latent vectors (n=8) is obtained by leave-one-subject-out cross-validation (LOSOCV).

References cited in example 4

[1] T. Fearn, NIR news, vol. 16, pp. 3-5, 2005.
[2] P. H. C. Eilers and H. F. M. Boelens, Leiden University Medical Centre Report, vol. 1, p. 5, 2005.
[3] R. Gautam, et al., EPJ Techniques and Instrumentation, vol. 2, pp. 1-38, 2015.
[4] P. Chowriappa, et al. "Introduction to machine learning in healthcare informatics," in Machine Learning in Healthcare Informatics, Springer, 2014, pp. 1-23.
[5] F. Lussier, V. et al. TrAC Trends in Analytical Chemistry, vol. 124, p. 115796, 2020.
[6] D. Ballabio and R. Todeschini, Multivariate Classification for Qualitative Analysis, Elsevier, 2009.
[7] R. D. Tobias and others, "An introduction to partial least squares regression," in Proceedings of the twentieth annual SAS users group international conference, 1995.
[8] H. Abdi, "Partial least square regression (PLS regression)," Encyclopedia for research methods for the social sciences, vol. 6, pp. 792-795, 2003.

The invention claimed is:

1. A method for determining hypoxia or post hypoxia in a fetus, the method comprising the steps of:
  (a) collecting, during labor, a Raman spectrum by contacting a tissue of the fetus with a cervical Raman probe, the Raman probe being fiber-coupled to a Raman spectrometer comprising a light source;
  (b) obtaining a multivariable data set that represents the collected Raman spectrum from the fetus; and
  (c) a computer identifying the fetus as hypoxic, post-hypoxic or normoxic in real-time by a predictive model that correlates the multivariable data set generated in step (b) with representative data sets from Raman spectra obtained from previously identified hypoxic, post-hypoxic and normoxic subjects,
  the predictive model having been generated by training using a plurality of Raman spectra from previously identified hypoxic, post-hypoxic and normoxic subjects and machine learning from the plurality of Raman spectra so as to obtain the representative data sets associated with hypoxia, post-hypoxia and normoxia.

2. The method of claim 1, wherein the training of the predictive model comprises the following steps:
  (i) randomly stratifying data obtained from the plurality of Raman spectra into
     a calibration dataset, and
     a validation dataset;
  (ii) developing the predictive model by applying a machine learning method selected from a regression method, a classification method or a combination thereof on the calibration dataset;
  (iii) optimizing the predictive model by an internal cross validation method; and
  (iv) further validating the predictive model using the validation dataset.

3. The method of claim 2, wherein the internal cross validation method is a k-fold cross validation comprising k cases, and wherein the k cases are used for testing only once and one at a time.

4. The method of claim 2, wherein a total dataset comprises the calibration dataset and the validation dataset, and wherein the calibration dataset consists of between 60% and 80% of the total dataset.

5. The method of claim 1, wherein the Raman spectrum is collected at a near infrared wavelength.

6. The method of claim 1, wherein the Raman spectrum is obtained by excitation at a wavelength of between 600 nm and 1000 nm.

7. The method of claim 1, wherein the machine learning method is selected from a regression method, a classification method and combinations thereof.

8. The method of claim 1, wherein step (c) is performed by a classification method.

9. The method of claim 8, wherein the classification method is selected from logistic regression, random forest, gradient boosting (GB), adaptive boosting (AB), extreme Gradient Boosting (XGB) k-nearest neighbors (kNN), artificial neural network (ANN), support vector machine (SVM), Partial Least Squares-Discriminant Analysis (PLS-DA) and combinations thereof.

10. The method of claim 1, wherein step (c) is performed by a regression method.

11. The method of claim 10, wherein the regression method is selected from multiple linear regression (MLR), principal component regression (PCR), partial least squares regression (PLSR), artificial neural network (ANN), support vector machine (SVM), random forest (RF), lasso regression, ridge regression and combinations thereof.

12. The method of claim 1, wherein step (c) is performed by Partial Least Squares-Support Vector Machine analysis or Partial Least Squares-Random Forest analysis.

13. The method of claim 1, wherein collecting the Raman spectrum comprises collecting a plurality of Raman spectra of the tissue of the fetus, and determining an average or median Raman spectrum as the collected Raman spectrum.

14. The method of claim 13, comprising collecting at least ten Raman spectra of the tissue of the fetus.

15. The method of claim 1, wherein the multi variable data set that represents the collected Raman spectrum include one or more of peak area, peak intensity, peak intensity ratios or area ratios, first and higher derivatives, and wavelength shift.

16. The method of claim 1, wherein the Raman spectra are pre-processed in the processor by deleting cosmic ray features.

17. The method of claim 16, wherein the Raman spectra are further pre-processed after deleting the cosmic ray features by subtracting a background signal from the Raman spectrum and by smoothing the Raman spectrum by applying a filtering technique.

18. The method of claim 17, wherein the Raman spectra are further pre-processed by applying a scatter correction and/or applying a variable mean-centering method.

19. The method of claim 1, wherein the tissue of the fetus is tissue from a head of the fetus.

20. The method of claim 1, wherein the tissue of the fetus is skin tissue from a scalp of the fetus.

* * * * *